United States Patent
Pekonen et al.

(10) Patent No.: US 8,670,372 B2
(45) Date of Patent: Mar. 11, 2014

(54) SYSTEM AND METHOD FOR SCHEDULING AND TRANSFERRING DATA THROUGH A TRANSMISSION SYSTEM

(75) Inventors: Harri J. Pekonen, Raisio (FI); Jani Väre, Kaarina (FI); Jussi Vesma, Turku (FI)

(73) Assignee: Nokia Corporation, Espoo (FI)

( * ) Notice: Subject to any disclaimer, the term of this patent is extended or adjusted under 35 U.S.C. 154(b) by 1123 days.

(21) Appl. No.: 12/132,512

(22) Filed: Jun. 3, 2008

(65) Prior Publication Data

US 2009/0059887 A1 Mar. 5, 2009

Related U.S. Application Data

(60) Provisional application No. 60/941,927, filed on Jun. 4, 2007.

(51) Int. Cl.
*H04B 7/212* (2006.01)

(52) U.S. Cl.
USPC ............ 370/321; 370/337; 370/347; 370/442

(58) Field of Classification Search
USPC .................................. 370/321, 337, 347, 442
See application file for complete search history.

(56) References Cited

U.S. PATENT DOCUMENTS

| | | | | |
|---|---|---|---|---|
| 6,094,425 | A * | 7/2000 | Auger et al. ................... | 370/330 |
| 2005/0180360 | A1* | 8/2005 | Hansen et al. ................. | 370/334 |
| 2008/0225995 | A1* | 9/2008 | Auranen et al. ............... | 375/344 |

FOREIGN PATENT DOCUMENTS

| | | |
|---|---|---|
| EP | 0680168 | 11/1995 |
| JP | 7303090 | 11/1995 |
| WO | WO 2004/084475 | 9/2004 |

OTHER PUBLICATIONS

Nokia et al, DVB-T2 Concept, Jun. 4, 2007.*
International Search Report for PCT Application No. PCT/IB2008/052106 mailed Feb. 10, 2009.
Korean Office Action for Korean Patent Application No. 10-2009-7026509, dated Mar. 22, 2011.
English translation of Korean Office Action for Korean Patent Application No. 10-2009-7026509, dated Mar. 22, 2011.
Notification of 2nd Office Action in CN200880018860.0 dated Jan. 29, 2013, with English translation.
English translation of Notification of 3rd Office Action in CN200880018860.0 dated Jun. 20, 2013, with summary.

(Continued)

*Primary Examiner* — Mark Rinehart
*Assistant Examiner* — Mang Yeung
(74) *Attorney, Agent, or Firm* — Banner & Witcoff, Ltd.

(57) ABSTRACT

A system and method for dynamically dividing the capacity of a fixed time division multiplexing (TDM) frame between physical channels for data transmission. According to various embodiments, a time frequency frame is divided into a plurality of subframes, and each of the plurality of subframes are divided into a plurality of corresponding slots. The plurality of slots are then selectively time shifted such that a defined time shift exists between corresponding slots in each subframe within the time frequency frame. For any slots or slot portions which have been selectively shifted beyond the end of the time frequency frame, such slots or slot portions are cyclically shifted to the beginning of the frame. Service data is then written into the slots of the time frequency frame, and the frame containing the service data can then be transmitted. Initialization and service access processes for a receiver are also provided.

16 Claims, 15 Drawing Sheets

(56) References Cited

OTHER PUBLICATIONS

Adi, et al., "Performance of Time-Frequency Sliced Systems with Dynamic Channel Allocation, Personal, Indoor and Mobile Radio Communications", 1997. 'Waves of the Year 2000'. PIMRC '97, The 8th IEEE International Symposium, IEEE, Sep. 1, 1997, vol. 2, pp. 420-424, <URL, http://ieeexplore.ieee.org/xpls/abs_all.jsp?arnumber=6309658,tag=1IEEE 1997>.

Karol, et al., "Time-Frequency-Code Slicing: Efficiently Allocating the communications Spectrum to Multirate Users", IEEE Transactions on Vehicular Technology, vol. 46, No. 4, Nov. 1997, pp. 818-826, <URL, http://ieeexplore.ieee.org/stamp/stamp.jsp?arnumber=00653056>.

Office Action in JP2010-510924 with English Translation, dated Jan. 10, 2012.

Notification of the First Office Action in CN200880018860.0 dated Jun. 18, 2012, with English translation.

Non-Final Rejection in KR 10-2009-7026509 dated Nov. 24, 2011 with English Translation.

* cited by examiner

SYSTEM AND METHOD FOR SCHEDULING AND TRANSFERRING DATA THROUGH A TRANSMISSION SYSTEM

FIELD OF THE INVENTION

The present invention relates generally to the transferring of data in a transmission system. More particularly, the present invention relates to the use of time-frequency (TF) slicing for use in transmitting data in a data transmission system.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Digital broadband broadcast networks enable end users to receive digital content including video, audio, data, etc. Using a mobile terminal, a user may receive digital content over a wireless digital broadcast network.

The capacity of a wireless transmission channel, in a broadcasting system, for example, can be divided between different services by using time-division multiplexing (TDM). Each service reserves a slot in a TDM frame, which results in a fixed bit rate. The bit rate is determined by the size of the slot and the frame interval. Some services, such as a real-time video service, can have a variable bit rate.

TDM capacity has typically been reserved according to the maximum bit rate of the video service in order to guarantee that the stream always fits into the reserved slot. Most of the time, however, the reserved slots are not completely filled resulting in wasted transmission capacity.

Systems have been identified to more completely fill reserved TDM slots in order to reduce wasted transmission capacity. However, it is still desirable to provide a system and method by which transmission capacity can be further increased, for example to increase the number of services that may be provided.

SUMMARY OF THE INVENTION

Various embodiments provide a system and method for dynamically dividing the capacity of a fixed time division multiplexing (TDM) frame between physical channels for data transmission. According to various embodiments, a time frequency frame is divided into a plurality of subframes, and each of the plurality of subframes are divided into a plurality of corresponding slots. The plurality of slots are then selectively time shifted such that a defined time shift exists between corresponding slots in each subframe within the time frequency frame. For any slots or slot portions which have been selectively shifted beyond the end of the time frequency frame, such slots or slot portions are cyclically shifted to the beginning of the frame. Service data is then written into the slots of the time frequency frame, and the frame containing the service data can then be transmitted. Initialization and service access processes for a receiver are also provided.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 8 is a representation of two consecutive TF frames;

FIG. 9 is a representation showing the inclusion of a plurality of pilot signals P1 and P2 in a time frequency slicing (TFS)-frame;

DETAILED DESCRIPTION OF VARIOUS EMBODIMENTS

Various embodiments provide a system and method for dynamically dividing the capacity of a fixed TDM frame between physical channels for data transmission. Physical channels are TDM channels that reserve the specified slot from the frame, with one physical channel being capable of carrying one or more logical channels. Using such TF slicing, bit rate variations are averaged over all of the services being provided, thereby resulting in a decreased overall bit rate variation and a lower amount of wasted capacity. With time-frequency slicing according to various embodiments, several RF channels are used to increase the size of the TDM frame at issue and to multiplex services over all of the channels. The number of services being provided is increased proportionally relative to he number of RF channels, resulting in an increased statistical multiplexing gain. This arrangement also provides frequency diversity by extending the channel coding and interleaving over all of the available RF channels.

Figure 1:
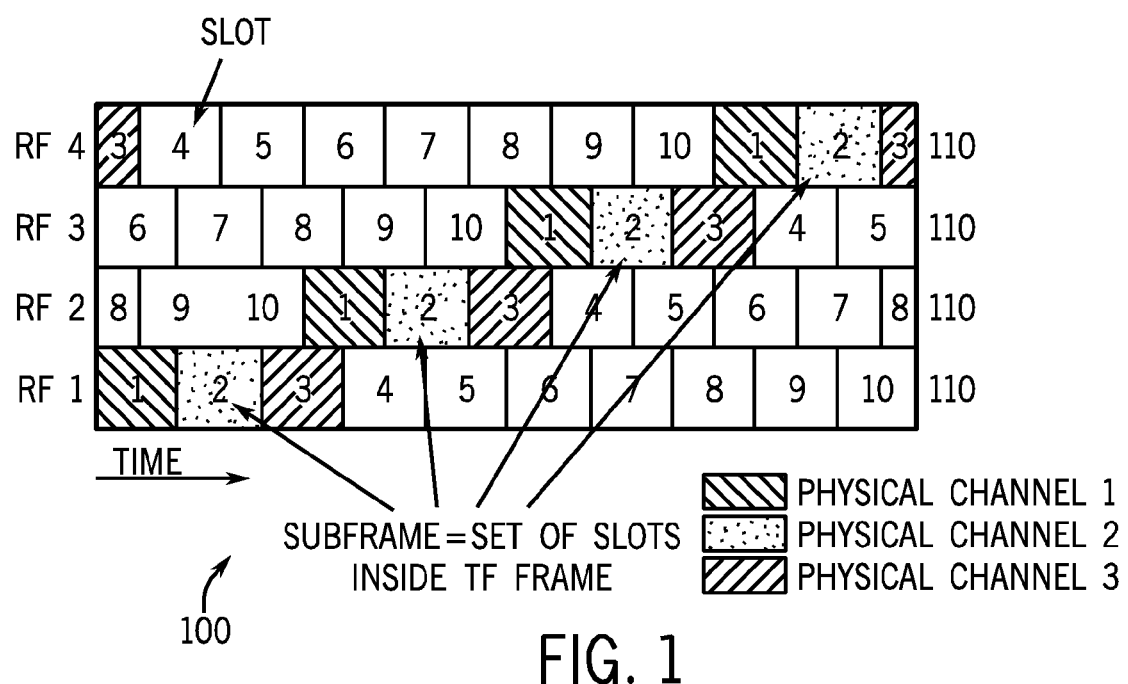
FIG. 1 is a representation of a TF frame including four RF channels ($N_{RF}=4$) and ten physical channels (slots) according to one exemplary embodiment.

FIG. 1 shows a TF frame 100 where four RF channels ($N_{RF}$=4) and ten physical channels (slots) are included in one exemplary embodiment. As shown in FIG. 1, the TF frame 100 includes four $N_{RF}$ fixed TDM frames 110, one for each RF channel (identified as RF1, RF2, RF3 and RF4). Each physical channel typically includes one slot in every RF channel during the TF frame 100. There must be a time shift between the slots of a certain physical channel in different RF channels. This makes it possible to use receivers with one tuner, because the receiver then has time to tune to the new frequency before receiving the next slot. It should be noted that one slot may be divided into two parts which are located at the beginning and end of the TF frame 100. An example of this concept is depicted in subframe 3 of RF4 in FIG. 1. The number of RF channels can be $N_{RF}$=2, 3, 4, 5, 6 or even more in various embodiments. The used RF channels do not need to be adjacent to each other.

One advantage to using TF slicing according to various embodiments slicing is that the remainder capacity after service allocation is reduced compared to the case where $N_{RF}$=1. For example, Table 1 is an example configuration for TDM frame and slot structures. The number of orthogonal frequency division multiplexing (OFDM) symbols K is selected such that, with given OFDM parameters, the frame duration is 148 ms. There are 7 services with three different bit rates—2, 3, and 10 Mbps. There are three combinations of coding and modulation parameters for the services. The average slot duration varies from 10 ms up to 56.5 ms and 92.9% of the total capacity is used.

TABLE 1

| OFDM parameters | | | | | | | |
|---|---|---|---|---|---|---|---|
| Mode | | | | 8 K | | | |
| GI | | | | 1/32 | | | |
| Bandwidth | MHz | | | 8 | | | |
| TDM parameters | | | | | | | |
| K (OFDM symbols in frame) | | | | 160 | | | |
| L (slots in frame) | | | | 7 | | | |
| M (frames in super frame) | | | | 16 | | | |
| Time Intervals | | | | | | | |
| $T_S$ OFDM symbol duration | ms | | | 0.92 | | | |
| $T_F$ frame duration | ms | | | 148 | | | |
| $T_{SF}$ super frame duration | ms | | | 2365 | | | |
| Services | | 1 | 2 | 3 | 4 | 5 | 6 | 7 |
| Service bit rate | Mbps | 10.0 | 3.0 | 3.0 | 3.0 | 2.0 | 2.0 | 2.0 |
| CR | | 1/2 | 2/3 | 2/3 | 2/3 | 3/4 | 3/4 | 3/4 |
| Modulation | | 256 QAM | 64 QAM | 64 QAM | 64 QAM | 64 QAM | 64 QAM | 64 QAM |
| Slot parameters (average) | | 1 | 2 | 3 | 4 | 5 | 6 | 7 |
| Slot size in OFDM symbols | | 61.1 | 18.3 | 18.3 | 18.3 | 10.9 | 10.9 | 10.9 |
| $T_L$ slot duration | ms | 56.5 | 16.9 | 16.9 | 16.9 | 10.0 | 10.0 | 10.0 |
| Fraction of the total capacity | | 38.2% | 11.5% | 11.5% | 11.5% | 6.8% | 6.8% | 6.8% |
| Total number of used symbols in frame | | 148.7 | 92.9% | | | | | |

In the example of Table 1, for $N_{RF}=1$, two services with 10 Mbps data rate, 256 Quadrature Amplitude Modulation (QAM) and CR=½, would fit into the frame, resulting into capacity usage of 76.4% of the TDM frame. In other words, the amount of wasted capacity is 23.6%. In contrast, for TF slicing with $N_{RF}=4$, 10 services with the same parameters fit into the TF frame, resulting into capacity usage of 95.9% and wasted capacity of only 4.5%.

In terms of tuning time requirements, the transmitter must guarantee that the slots are separated at least by a certain time interval such that receivers with only one tuner can successfully receive TF slicing transmissions. This interval is denoted as $T_{tuning}$ and is the minimum time interval between two slots in different RF channels. These two slots belong to the same physical channel. The time interval is measured from the end of one slot to the beginning of the next slot.

For the receiver, $T_{tuning}$ is the maximum amount time the receiver has to change the RF channel and to prepare to receive the next data slot. A number of procedures are performed during $T_{tuning}$-phase-locked loop (PLL) tuning, automatic gain control (AGC) tuning, and channel estimation.

Based on the short frame duration $T_F$ (e.g. 100-150 ms), it is assumed that the frequency and symbol time synchronizations need not to be done before receiving the slot. These synchronization parameters can be updated during the receiving of the slot. If, for example in DVB-T, it is assumed that PLL and AGC tuning takes 5 ms, and 4 symbols are used for channel estimation, then around 10 ms are needed for 8 k symbols. However, some margin must be left to take into account different implementations and possible effects of the channel. For example, it may be difficult to achieve low phase noise for fast PLL, especially for 256 QAM or other higher order modulation.

In one embodiment, more than one value for $T_{tuning}$ is specified for different transmission parameter combinations. For example, if the channel estimation is done by using 4 orthogonal frequency division multiplexing (OFDM) symbols, then the time spent for this procedure depends on the transmission mode. One suitable value for $T_{tuning}$ is 10 ms for the 8 k mode.

With regard to the receiver memory, because the coding and interleaving is done over the whole subframe, the receiver must have sufficient memory in order to make the deinterleaving. The maximum size of this memory is estimated in one embodiment by assuming (1) one service is received having a L2 bit rate of 15 Mbps; (2) a code rate of ½; (3) five soft bits for the decoder; (4) a convolutional interleaver (which halves the memory requirement); and (5) a frame duration $T_F=120$ ms. The resulting memory size of the receiver with these parameters is 9 Mbits.

The location and size of the slot changes from TF frame to TF frame. Therefore, there is a need for dynamic L1 signaling that indicates the location of the slot in time and frequency (RF channel). This signaling is needed for each TF frame and for each physical channel in the frame. It may be that all the slots belonging to one physical channel do not need own signaling because the size of the slots is equal (in the frame boundaries, the slot may be divided into two sub-slots) and the slot interval is constant within the TF frame.

Figure 2:
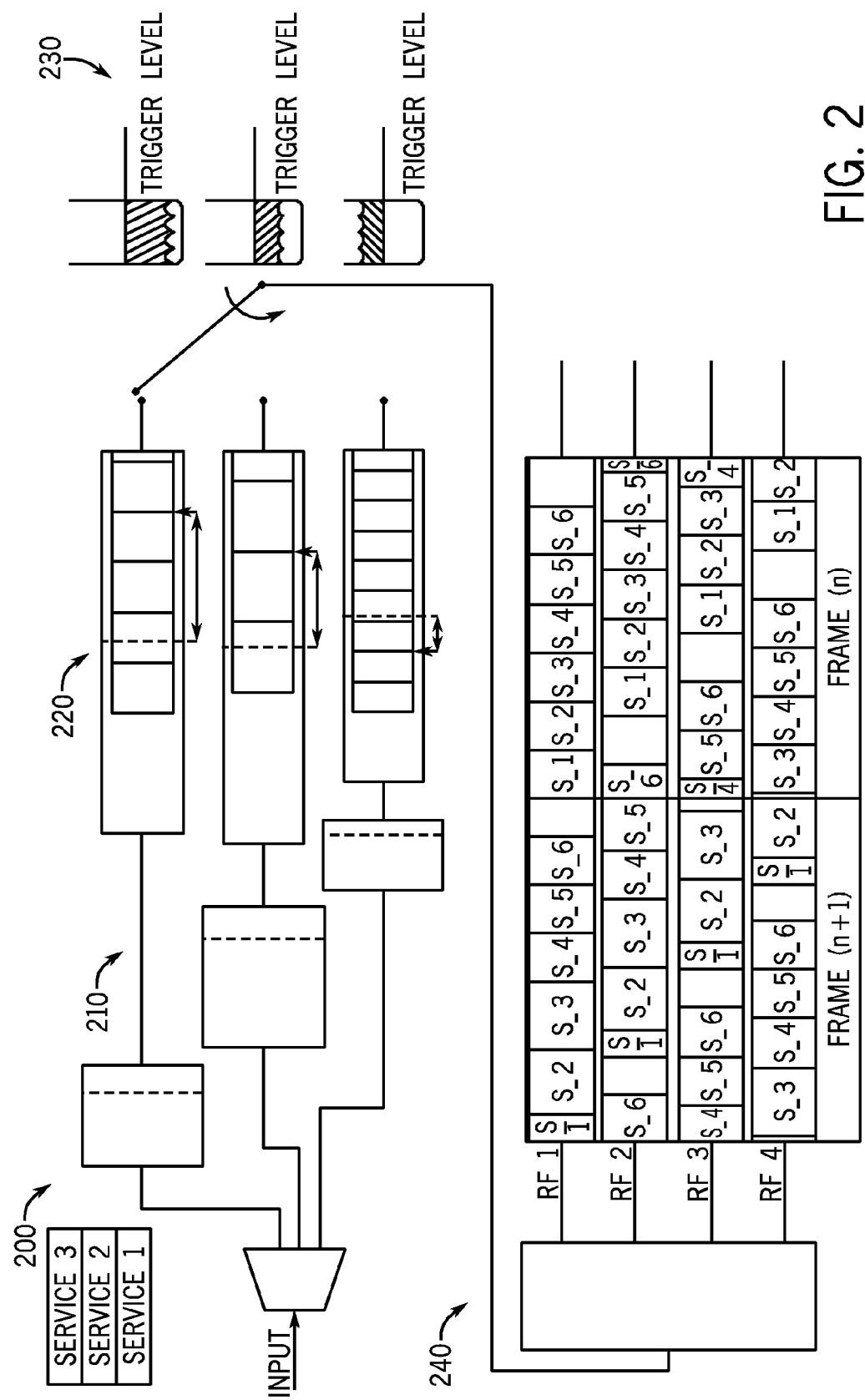
FIG. 2 is a generic block diagram showing the structure of a transmitter operating in accordance with various embodiments.

FIG. 2 is a generic block diagram showing the structure of a transmitter 200 operating in accordance with various embodiments of the present invention. At 210 in FIG. 2, input data undergoes forward error correction and interleaving, after which buffers are used to compensate for input bit-rate variations at 220. At 230, a simple schedule monitors input buffer levels. Based upon the fill levels, capacity allocations for the individual frames are determined. At 240, framing, phase shifting, and data mapping to symbols and carriers occurs for the individual frames.

Figure 3:
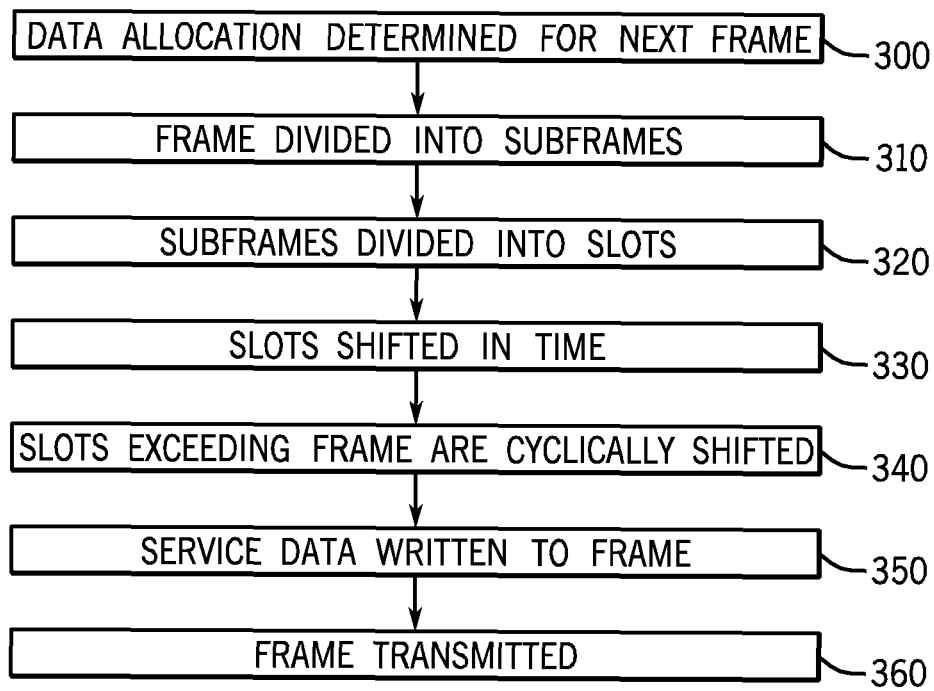
FIG. 3 is a flow chart illustrating how a TF frame is constructed at the transmitter according the various embodiments.
Figure 4:
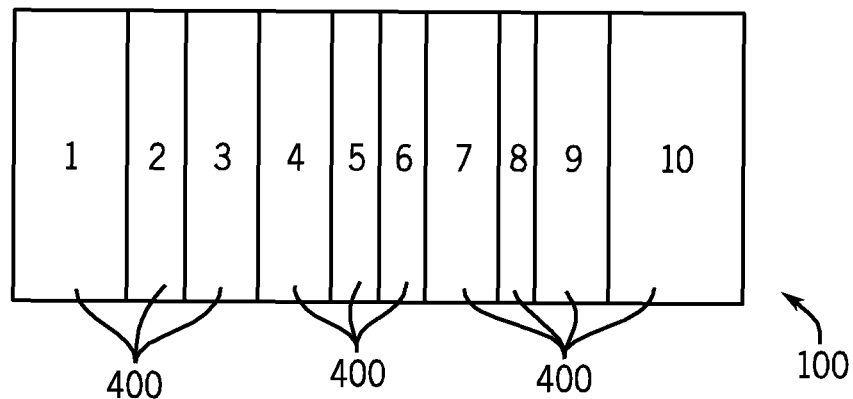
FIG. 4 shows how a TF frame is divided into a plurality of subframes, with one subframe for each physical channel.

FIG. 3 is a flow chart illustrating how a TF frame is constructed at the transmitter according the various embodiments. In this example, the following values are assumed and are only exemplary in nature:
  Number of slots is L=10
  Number of physical channels is 10
  Number of services is 10
  Exactly one service is mapped into one physical channel and further into one slot
  Frame duration is $T_F=120$ ms
  Number of RF channels is $N_{RF}=4$
  Maximum tuning time is $T_{tuning}=10$ ms At 300 in FIG. 3, a data allocation for a next frame of data is decided. For subframes within the frame of data, It is assumed that each subframe consists of data from one service (or physical channel). The size of each subframe depends on a predetermined set of rules and trigger levels for the input buffers at 230 in FIG. 2. It should be noted that the size of the TF frame in bits is not constant because of the dynamic size of the subframes and physical channel specific coding and modulation parameters. However, the size is constant in OFDM symbols or useful carriers per TF frame. FIG. 4 shows the dividing of the TF frame 100 into a plurality of subframes 400, which is also represented at 310 in FIG. 3. In this case, it is assumed that there is only one service in each subframe.

Figure 5:
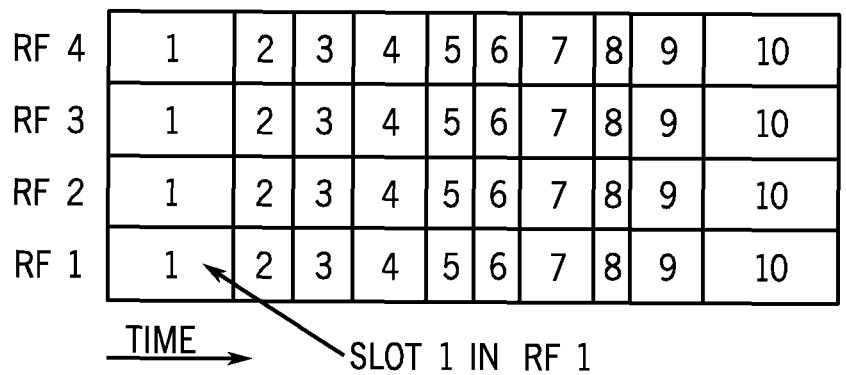
FIG. 5 shows how individual subframes are divided into slots, with one slot for each RF channel.
Figure 6:
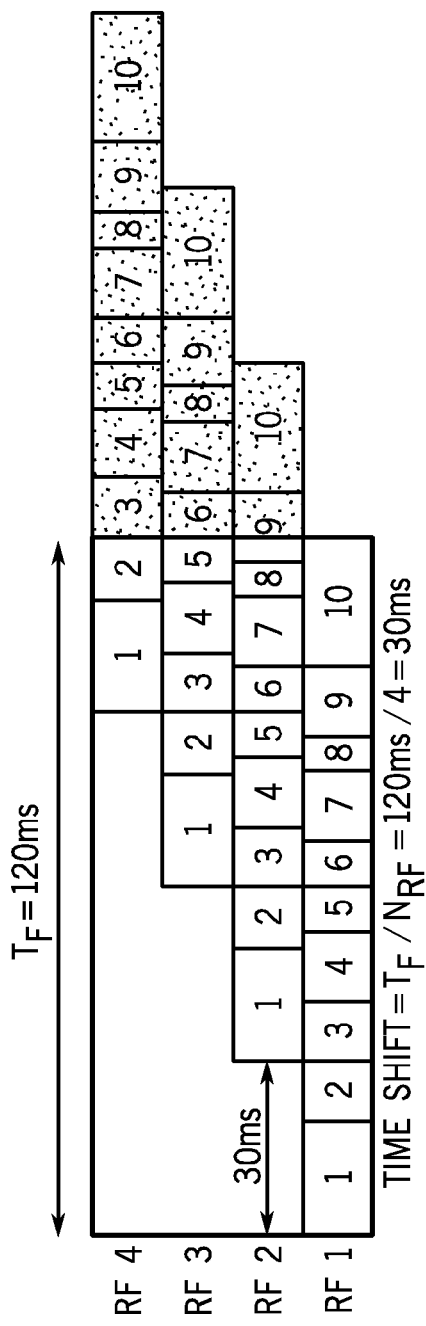
FIG. 6 shows the process by which time shifting is performed between RF channels, with the time shift being determined by the frame duration $T_F$ and the number of RF channels.

At 320 in FIG. 3, the subframes are divided into slots, with one slot for each RF channel. It should be noted, however, that is also possible for there to be more than one slot for each RF channel in certain embodiments. In one embodiment, for every subframe, the $N_{RF}$ slots have equal size. FIG. 5 shows the TF frame 100 after each subframe 400 has been divided into individual slots. At 330, the slots are shifted in time such that the time shift from one RF channel to the next is 30 ms. The amount of the time shift is defined by the frame duration $T_F$ and the number of RF channels $N_{RF}$, as shown in FIG. 6. This is the time shift that results in the maximum shift between slots in different RF channels. For example, any time shift other than 30 ms in this example would lead to an overlap between the first slot in each RF channel.

Figure 7:
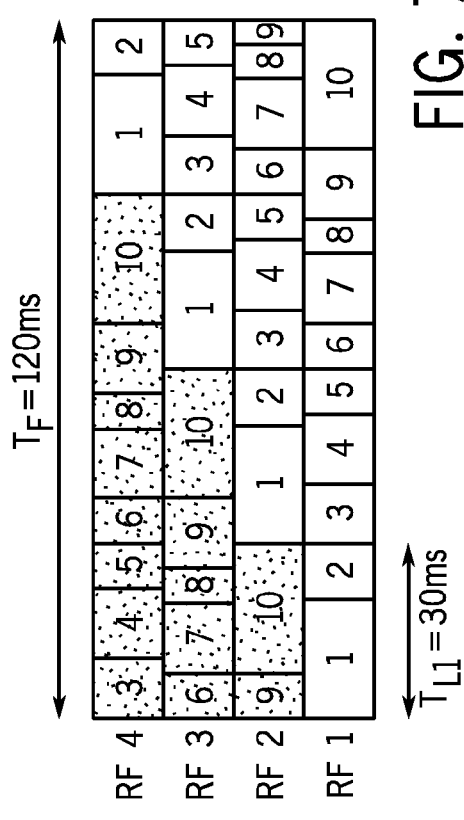
FIG. 7 shows the cyclical transfer of slots or slot fragments that exceed the end of a frame to the beginning of the frame according to various embodiments.

At 340 in FIG. 3, the slots that exceed the TF frame 100 are cyclically shifted to the beginning of the frame. It should be noted that some slots may be fragmented into two separate slots, such portions of one slot may be at both the beginning and end of the frame. One such slot, slot 9, is depicted in RF2 of FIG. 7. At this point, the TF frame is ready for transmission. Therefore, the maximum slot duration, denoted by $T_{max}$, must be limited. This limit is given by $$T_{max} = \frac{T_F}{N_{RF}} - T_{tuning}$$

In the above equation, $T_F$ is the TF frame duration, $N_{RF}$ is the number of RF channels, and $T_{tuning}$ is the maximum assumed tuning time when changing from one RF channel to the next. The transmitter must always guarantee that $T_{max}$ is not exceeded for any slot. In the present example, $T_{max}=20$ ms if it is assumed that $T_{tuning}=10$ ms.

At 350 in FIG. 3, the service data is written to the individual slots in the TF frame 100 and, at 360, the TF frame 100 is transmitted to one or more receivers.

Figures 8, 9:
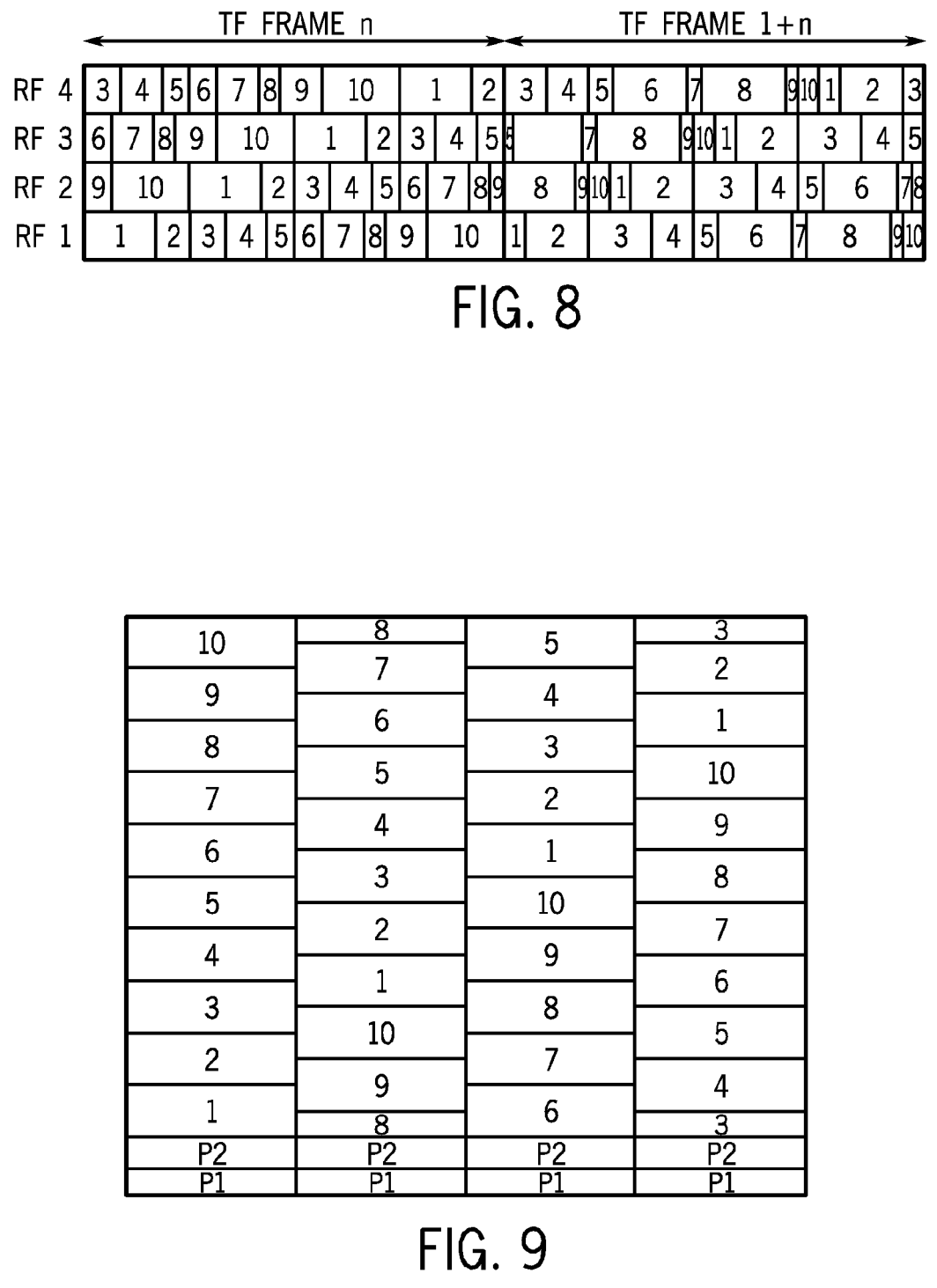

To illustrate the dynamic slot structures and their effects in the border of two frames, FIG. 8 shows two consecutive TF frames. In this situation, the transmitter has to construct two TF frames at a time because the dynamic signaling in the frame n carries information about the structure of the frame n+1. As shown in FIG. 8, the subframe has N or N+1 slots, where N is the number of RF channels. For example, subframe 9 has five slots in frame n and four slots in frame n+1. Additionally, the slot duration for a subframe is fixed, except in the case where the slot is divided into two parts at the end of the frame. For example, the first and last slot of subframe 9 in frame n are smaller than the other three slots of subframe 9. Also, it is also noted that there can be two consecutive slots belonging to different TF frames in the same RF channel. For example, subframe 5 has two consecutive slots in RF3 with a zero interval, while subframe 9 also has two consecutive slots in RF2, but with a nonzero interval. Still further, the time interval from the start of the slot to the start of the next slot in the same subframe is not necessarily constant. However, the interval from the end of the slot to the start of the next slot is constant inside one subframe. This is demonstrated, for example, by the slots of subframe 9 in TF frame n.

At the physical layer, various reference signals are inserted to the signal generated according to the embodiments discussed herein. Two pilot symbols, P1 and P2, are inserted in front of each frame. Pilot symbol P1 is used in the initial channel search for fast recognition of the signal and to enable the receiver to perform coarse and fine frequency synchronization and signal the used FFT-size. Pilot symbol P2 is used for fine synchronization, channel estimation and signaling. In the multi-frequency TF-slicing mode, both pilot symbols are inserted at the start of the TFS-frame in each frequency. The symbols at different frequencies are identical. The insertion of these pilot signals is depicted in FIG. 9 (although not necessarily to scale). Scattered pilots are inserted to all data symbols in order to enable the tracking of the initial channel estimate, as well as for other possible tracking functions. In the multi-frequency TF-mode, channel estimation may in one embodiment rely on scattered pilots (except perhaps at the frame boundary, where P2 can be used). Various different pilot patters with different pilot densities may be used for various receiving conditions. Continual pilots are provided in each data symbol for various tracking algorithms, as well as for possible Common Phase Error (CPE) correction.

The pilot symbol P1 has three principal purposes. First P1 is used during the initial signal scan for fast recognition of the TFS frame signal, for which simply the detection of the P1 signal is sufficient. The construction of P1 is such that any frequency offsets can be detected directly, even if the receiver is tuned to the nominal center frequency. This saves time in scanning, as the receiver does not have to separately test all of the possible offsets. The second task for P1 is to signal the used Fast Fourier Transform (FFT) size. This is required for decoding the next symbols, as P1 in one embodiment is always using a 2 k FFT. The third task for P1 is coarse frequency and timing synchronization.

P1 is a 2 k symbol with ¼ a guard interval having a symbol duration of 224 μs in an 8 MHz system and a guard interval duration of 56 μs in an 8 MHz system. The symbol is scaled normally to other channel bandwidths. Out of the 1705 active carriers, only 256 are used, while the others are set to zero. The used carriers occupy a 6.82992 MHz band from the middle of the normal 7.61 MHz signal bandwidth. On average, every 6$^{th}$ carrier is used, but the pattern is irregular with spacings of 3, 6 or 9. The first and last carrier indexes are:

$$K_{P1min}=88$$

$$K_{P1max}=1618$$

Figure 10:
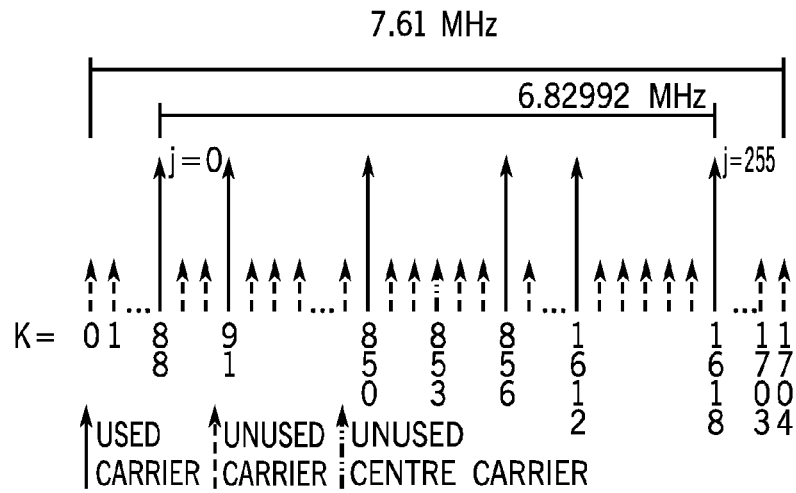
FIG. 10 shows a plurality of pilot signal P1 edge carriers, including both used and unused carriers.

The design of the P1 symbol is such that, even if a maximum offset of 0.5 MHz is used, all of the used carriers in the P1 symbol are still within the 7.61 MHz nominal bandwidth, and the symbol can be recovered with the receiver tuned to a nominal center frequency. Pilot symbol P1 edge carriers are shown in FIG. 10. In reviewing FIG. 10, it should be noted that the actual raster is random. The used carriers are modulated with binary phase shift keying (BPSK) modulation with a pseudo random pattern. In one embodiment, four different patterns are defined—one for each available FFT-size (2 k, 4 k, 8 k and 32 k in one embodiment). By recognizing the used pattern in P1, the receiver can determine the used FFT-size and decode the next symbol P2.

Pilot symbol P2 is used for four different tasks. First, P2 can be used for fine frequency and fine timing synchronization, thus improving the initial synchronization achieved with P1. The second task is to carry Open Systems Interconnection (OSI) layer 1 (L1) signaling information about the construction of the TF-frame. The third task is to provide an initial channel estimate, which is needed to decode the information in the P2 symbol itself, and in the first data symbols in the TF-frame. The fourth task is to provide a channel for carrying OSI layer 2 (L2) signaling information. This information is thus collected to a specific symbol rather than carrying it as part of the normal payload (data). This method simplifies the decoding of the required L2 signaling in the case of initial service discovery, as only pilot symbols have to be received and decoded. As the number of available carriers in different FFT-modes is different and the L2-signaling needs are constant, the number of P2 symbols varies according the FFT-size as follows:

8 k FFT size—one P2 symbol (for other FFT sizes as 32 k or 16 k or 1K, the number of symbols may be defined)

4 k FFT size—two P2 symbols 2 k FFT size—four P2 symbols

With the above arrangement, the time used for P2, as well as the signaling capacity, is constant. Additionally, the overhead also remain constants, as the TF-frame length is fixed.

The P2 symbol is a full FFT-size symbol with a ¼ guard interval (or with a 32 k FFT-size limited to the longest GI in one embodiment). All active carriers are used. In one embodiment, 256 out of the total number of carriers are used as pilots, with a similar pattern and modulation as in the P1 symbol. Additional pilot carriers are inserted so that the total number of pilot carriers (P1+additional) is, in one embodiment, ⅓ of the total number of carriers. This enables the receiver to make one-shot channel estimation by performing only frequency interpolation. The remaining ⅔ of the carriers may be used for forming two signaling channels for L1 and L2. In the case of 8 k and just one P2 symbol, 4544 carriers are left for signaling. In various embodiments, about 1000 of these carriers can be used for L1 signaling and the rest for L2 signaling. If several P2 symbols exist (i.e., 2 k and 4 k), both L1 and L2 signaling may be spread over all symbols. This enhances the robustness against impulsive interference.

The L1 signaling channel is used to signal the construction of the TF-frame. As this information is needed immediately after decoding, and as it is possible that the receiver has to perform a jump to another frequency to decode the slot associated to the wanted service, L1 signaling in P2 is referring not to the immediately following TF-frame, but to the frame after the immediately following frame. L1 signaling may comprise in one embodiment at least the following information:

3 bits for the Guard Interval {¼, ³⁄₁₆, ⅛, ¹⁄₁₆, ¹⁄₃₂}
For each service:
20 bits for position of the service start (symbol, carrier group (for example 10 carriers), fixed resolution->less bits for symbol number and more bits for carrier group in large FFT)
3 bits for service code rate {½, . . . ⅞}
2 bits for service modulation {Quadrature Phase Shift Keying (QPSK), 16 QAM, 64 QAM, 256 QAM}
4 bits for multiple-input-multiple-output (MIMO) information
8 bits for frame number
a number of bits for future use may also be reserved All signaling carriers are modulated with Differential Quadrature Phase Shift Keying (DQPSK), carrying 2 bits of information per carrier. As the L1 signaling has to be very robust, a strong coding is used with a coding rate of ½. Therefore, roughly a total of 1000 information bits can be carried for L1 signaling. The rest of the carriers are used for L2 signaling. No coding is used within the symbol; error protection happens in the higher layer. It should also be noted that pilot carriers may be transmitted with a boosted power level.

Signaling and service discovery is split into upper layer and physical layer signaling. The upper layer signaling of MPEG-2 TS adaptation is based on that of defined in DVB-T. In the GS/GSE adaptation, it may be defined and should be in the scope of system layer sub-group for the signaling discussed herein. However, the physical layer signaling is similar in the both profiles and, hence, the MPEG-2 TS and GS/GSE adaptation may have a common entry parameter which maps either or both of the adaptations with the physical layer.

Figure 11:
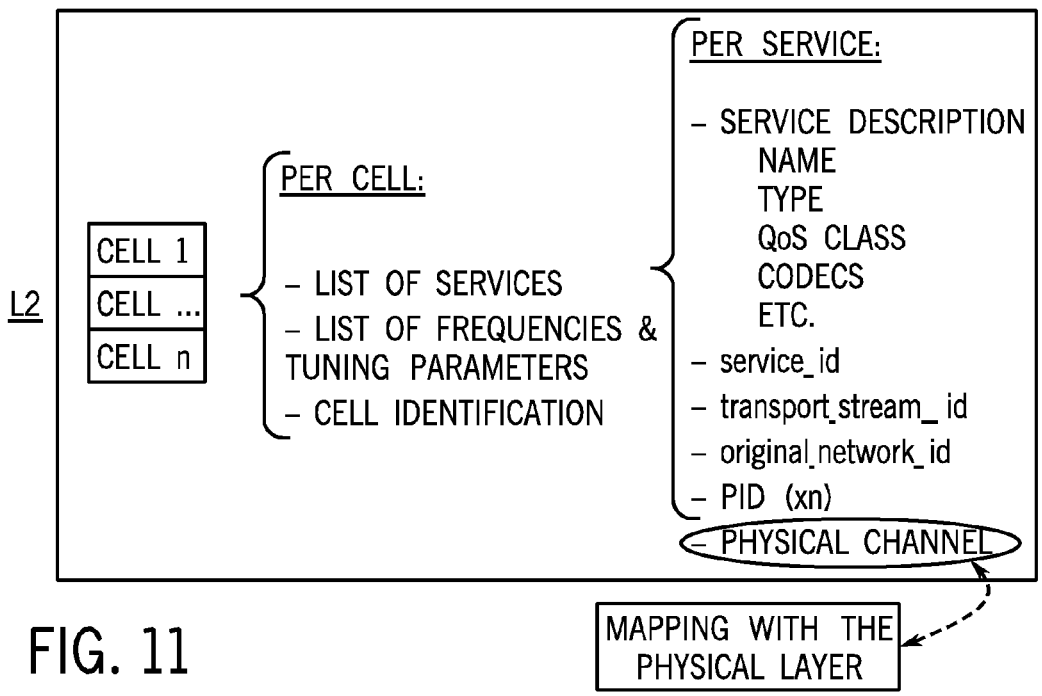
FIG. 11 shows the principles involved in upper layer signaling within the MPEG-2 adaptation of various embodiments discussed herein.

The upper layer signaling principle of MPEG-2 TS adaptation is very similar to that of in the DVB-T. All signaling is provided in L2 by means of PSI/SI and only a few new parameters need to be defined. Similarly and as in the DVB-T, the cell information and tuning parameters are provided within the network information table (NIT). Service description and scheduling is signaled within the service delivery table (SDT) and the event information table (EIT). Finally, the services are mapped with the elementary streams through the program association table (PAT) and the program map table (PMT). The upper level signaling principal within the MPEG-2 TS adaptation is explained in detail in FIG. 11.

Figure 12:
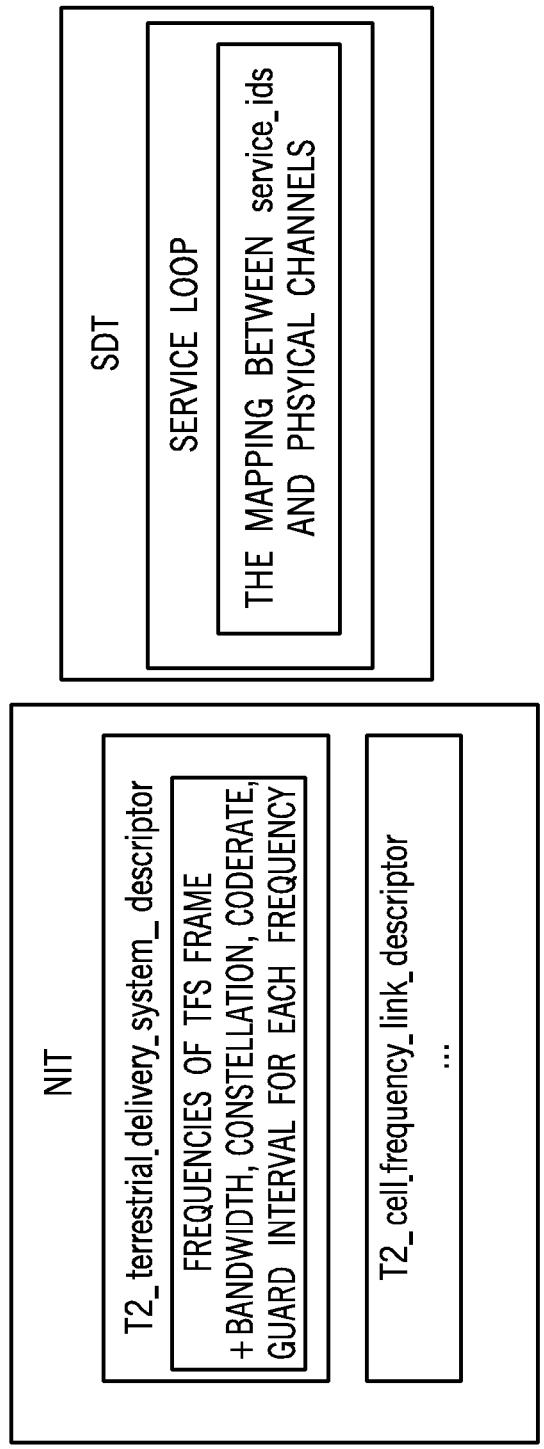
FIG. 12 shows a generic signaling principal for the MPEG-2 adaptation of various embodiments discussed herein.

A primary difference between the DVB-T signaling and signaling of the MPEG-2 TS adaptation profile is in the physical layer and related signaling. The physical channel is a new parameter which maps services with physical layer signaling. Also, each subframe of the TFS frame needs to be signaled within the NIT. Otherwise the signaling within the PSI/SI information identifies those descriptors already used within the DVB-T. A generic signaling principle of the latter is described within FIG. 12.

Figure 13:
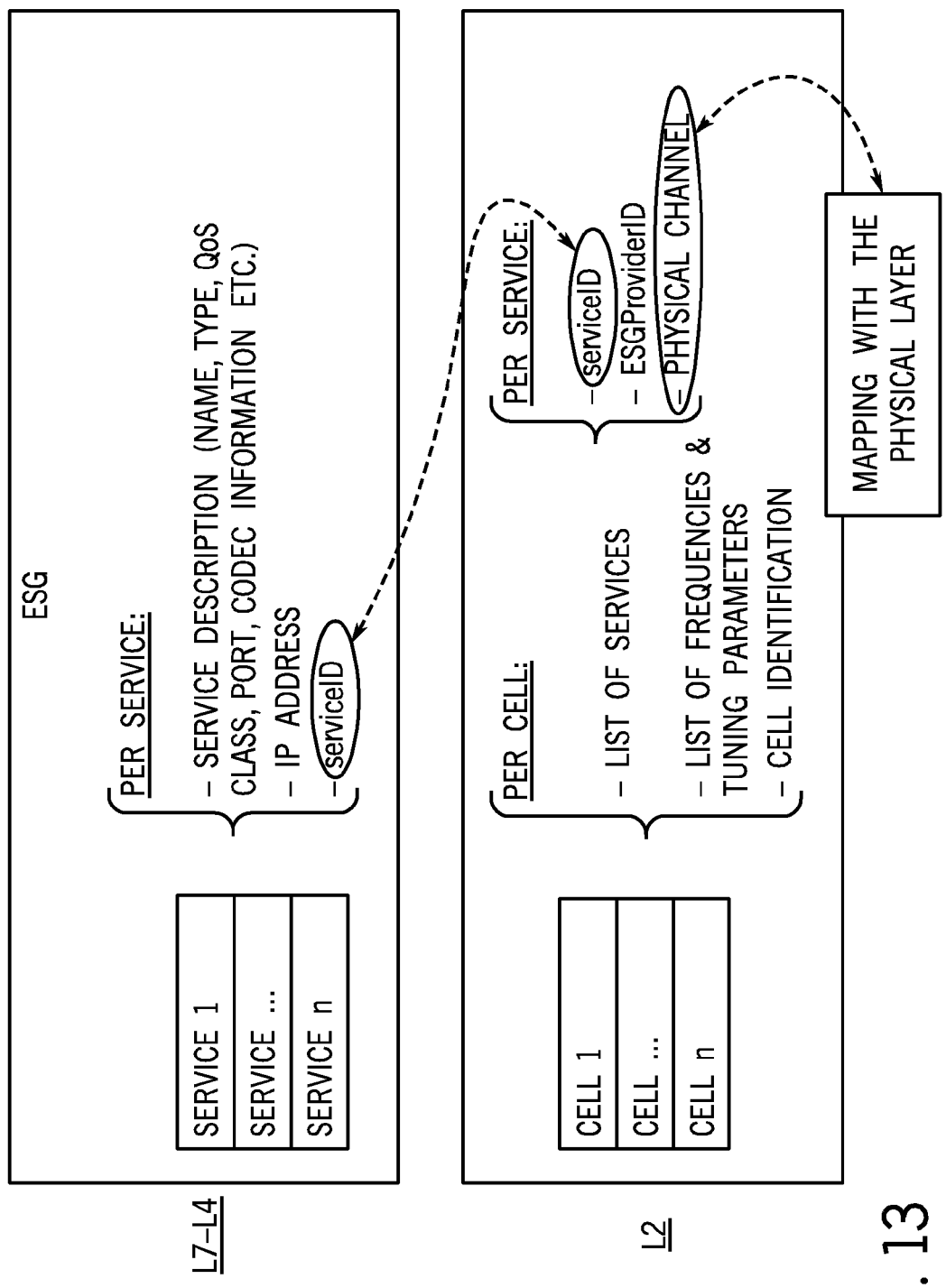
FIG. 13 depicts an example of the upper layer signaling within the GS/GSE adaptation.

The mapping of IP services with the logical channel depends on the supported protocol stack above IP. However, if each IP-based service (regardless of the protocols that are supported above IP) is associated with one logical channel, the same physical channel structure can be used in all systems supporting GS/GSE adaptation. The logical channel can be used as an identifier within the GSE packet header. FIG. 13 depicts an example of the upper layer signaling within the GS/GSE adaptation, where the service description and IP addresses of each service are associated with serviceID within OSI layers 4-7. The L2 signaling associates one or more serviceIDs with a logical channel, which is further associated with physical channels of different cells. Finally, the physical channel provides mapping between upper layer and physical layer. Therefore, the serviceID is the unifying element between L2 and L4-L7, while the physical channel links the upper layer and the physical layer. Moreover, in order to enable full mobility support, each cell must provide signaling at least for the services available within the current and neighboring cells.

The physical layer signaling is carried within the first two OFDM symbols, i.e. P1 and P2 of each frame. In addition to the information signaled within P1 and P2, the receiver can use the physical position of the P1 and P2 for concluding information, which can be used to improve synchronization process. The physical layer signaling has two purposes. First, it fastens the receiver synchronization and hence accelerates the service discovery process. Second, it identifies the location of each physical channel within the transmission frame. Based on this information, the physical layer signaling is split into static signaling and dynamic signaling.

The static signaling comprises the signaling of parameters needed for accelerating the synchronization process. The static signaling is carried in the beginning of each subframe of the TF-frame. Most of the static signaling is carried within P1. The static signaling of the physical layer includes the frequency offset, the FFT size, the guard interval correlation, the Cell_id and the Network_id.

In addition to the above, receiver performs several procedures in order to more quickly perform synchronization. These procedures include coarse frequency and timing synchronization based on the position of P1; fine frequency and timing synchronization based on the position of P2; and initial channel estimation based upon the position of P2.

Dynamic signaling comprises the real-time signaling, which is unique for each frame. It is carried within one or more P2 symbols. The number of used P2 symbols depends on the used modulation and the amount of needed signaling. Dynamic signaling provides information on the next TF-frame. The information is TFS-frame-specific and physical channel-specific. The TF-frame-specific information includes both the guard interval and the frame number. The physical channel-specific information includes the location of the slot inside the symbol (i.e., the carrier group); the modulation, the code rate; the Frame_number; the OFDM symbol number; and the carrier group.

Figure 14:
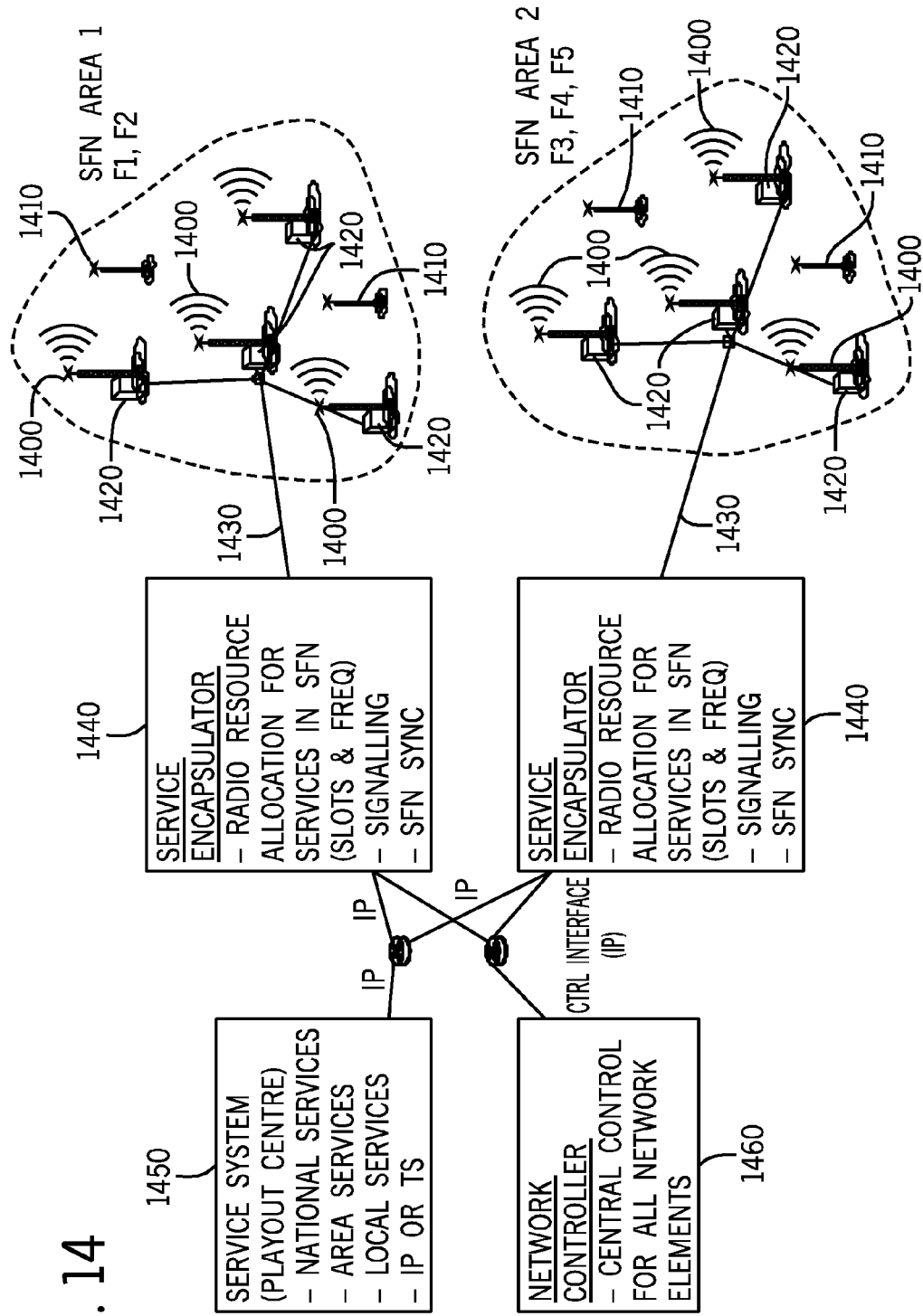
FIG. 14 is a representation of a general network topology within which various embodiments may be implemented.

The following is one possible implementation of a network according to one embodiment. The general network topology is depicted in FIG. 14. The basic radio network comprises relatively large Single Frequency Network (SFN)-areas (F1-F5), each of which can include several synchronized transmitters 1400 and optionally repeaters 1410. As the system can have several parallel frequencies in use with the TF-slicing, there are a number of frequencies used in each physical SFN-area. All of the transmitter sites must have as many parallel modulators 1420 as there are used frequencies in the TF-slicing arrangement. All of the transmitters are fed from a central site with a full stream, which includes all of the streams for each frequency multiplex together. A new interface 1430 is used for this for this purpose and may be based on a common existing physical interface such as a 1G Ethernet. The services of the present embodiment are formed in central service encapsulators (SE) 1440, which forms the TF-Frames for each SFN-area. Therefore, one service encapsulator per SFN-area is needed. The service encapsulators are connected to the actual playout centers 1450, which feed the different services to the network. The network is controlled by a central network controller 1460.

The network comprises various network elements, which differ from the DVB-T network elements from the functionality point of view. The service system can be similar to conventional DVB-systems. Programs are played out from storage units, encoded and sent over the IP network to the service encapsulators. The network can be controlled from a central network control center. It should be noted that the control interface is logically separated from the service interface, although both can be IP-based.

The SE is an important element in the network of the various embodiments and is used for allocating the radio resources to the services. Service streams (such as TS or IP streams) are received from the service system. The service encapsulator is formed from these superframes (fixed TDM frame structures comprising a series of frames), frames and the final TF-Frame, where services are in time slots at different frequencies. In addition, signaling information is inserted to the TF-frame, along with required synchronization information for the SFN. One option for this implementation involves using a GPS-based system as in conventional DVB-T systems.

Each used frequency in a transmitter site has its own modulator (or is combined into multifrequency units). The modulator of the various embodiments discussed herein demultiplexes from the stream the slots assigned to the frequency the modulator is using and performs the OFDM modulation and insertion of reference signals. In case the multifrequency mode in the various embodiments is used, repeaters have to operate at each used frequency.

In terms of network interfaces, three interfaces are identified. The first interface is the IP interface to the service encapsulators. The second interface is from the service encapsulators to the modulator. The third interface is the control interface.

The following are generic receiver implementation examples in different use cases. Initialization is performed when the receiver is switched on for the first time or in the location where information for none of the frequencies is available in the receiver database.

Including the pilot signals P1 and P2, the minimum time needed for a receiver to receive a frame can be represented by:

$$T_{FS}=N_{RF}*T_{max}+(N_{RF}+1)*T_{tuning}+T_{P1,P2}$$

In the above, $T_{FS}$ is the minimum frame time (including P1 and P2 signaling) reception. $N_{RF}$ is the number RF channels that are used. $T_{max}$ is the maximum slot duration. $T_{tuning}$ is the tuning time for the receiver. $T_{P1,P2}$ is the time needed to receive the P1 and P2 pilot signals.

Figure 15:
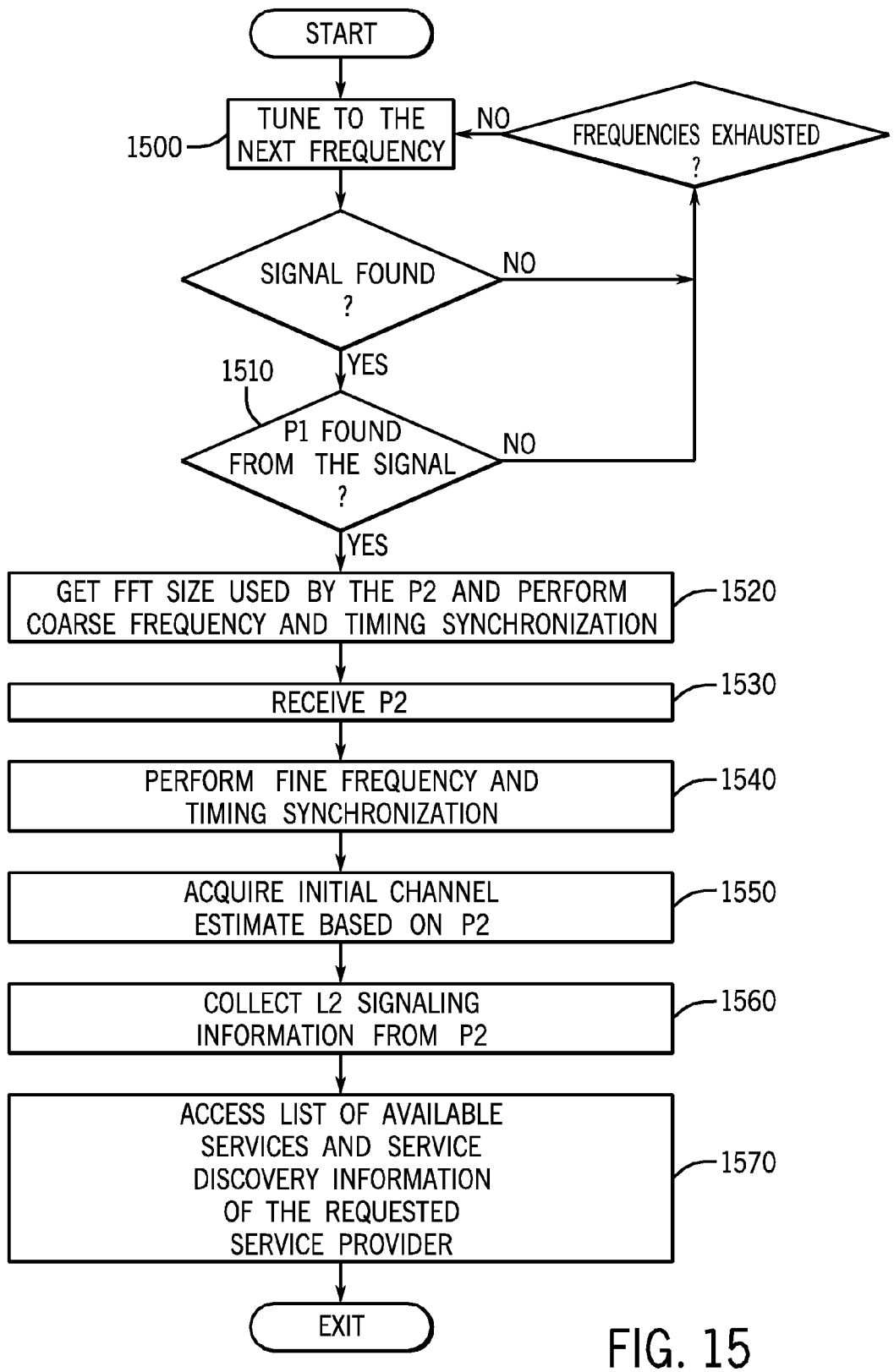
FIG. 15 is a flow chart showing an example initialization process in a receiver according to various embodiments.

FIG. 15 is a flow chart depicting the initiation dataflow according to various embodiments. At 1500 in FIG. 15, the receiver attempts to tune to the frequencies within the given frequency range. The starting frequency may vary depending on the information on the available frequencies within an area. By default, the starting frequency is the first frequency within DVB frequency range. If the signal is found, the receiver proceeds to 1510. Otherwise, the procedure starts from the beginning. At 1510, the receiver determines whether the P1 symbol is available within the tuned signal. If P1 is found, then the procedure continues to 1520. Otherwise, the procedure returns to 1500.

At 1520, the receiver acquires the FFT size used by the P2 from P1 and performs the coarse frequency and timing synchronization. The receiver receives the P2 at 1530. At 1540, fine frequency and timing synchronization is performed. At 1550, the initial channel estimation is performed based on the position of P2. At 1560, the L2 information is collected from P2. The receiver then acquires access information on all available services on the desired service provider at 1570. The access information on services available within neighboring cells is also acquired. At this point, the receiver is ready to select desired services and continue to the service access procedure.

Figure 16:
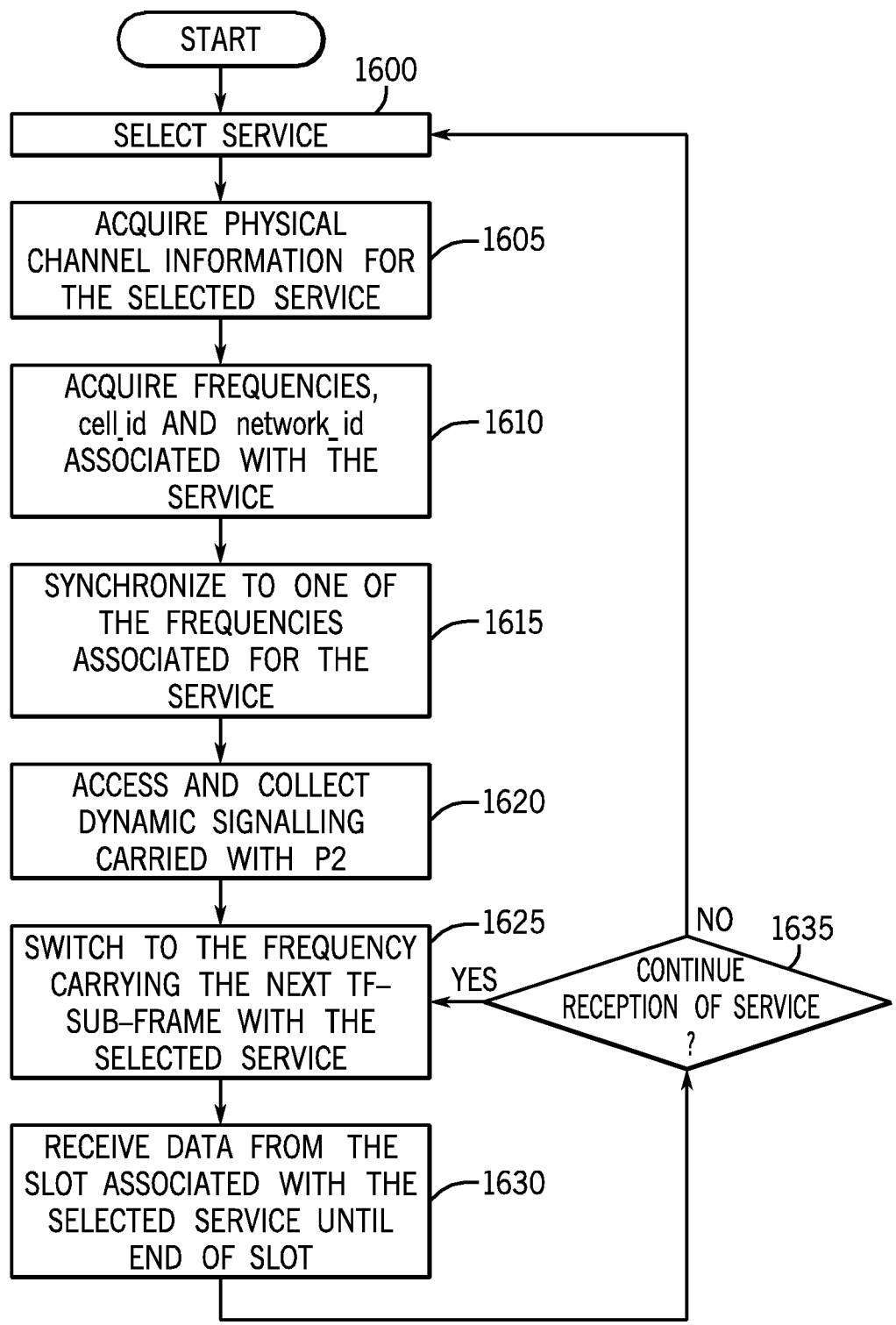
FIG. 16 is a flow chart showing an example service access process in a receiver according to various embodiments.

FIG. 16 is a flow chart depicting the receiver implementation flow from the point where end user selects desired service to the reception of the service. At 1600, the service is selected by the end-user. At this point, the service mapping to the physical channel (1605) and the service mapping to the cells and networks (1610) is acquired from the L2 signaling. At 1615, the receiver synchronizes to the frequency associated with the service. The number of the frequencies depends on the number of subframes allocated for the particular TFS-frame. After synchronizing to the selected frequency, the receiver gets access to P2 as occurs in the initialization process. At 1620, the receiver accesses and collects the dynamic signaling for the sought physical channel. At 1625 and based on the information provided by the dynamic signaling, the receiver may perform one of various actions. If the sought physical channel is available within the current TF-subframe, the receiver waits until it starts to receive it. If the sought physical channel is available in some other TF-sub-frame of the current TF-frame, the receiver switches to the TF-sub-frame carrying the requested physical channel. If the sought physical channel is available in some of the pursuant TF-frames, the receiver enters into a sleep mode and wakes up when the TF-frame with the sought physical channel is available. At 1630 and based on the dynamic signaling information, the receiver is able to receive the slot associated for the physical channel and to detect which symbol and which carrier group is the starting point for the first service carried within physical channel. At 1635, it is determined if the reception of service is to be continued. If so, then the process returns to 1630. Otherwise, the process returns to 1600.

The separation between the services, carried within the same physical channel, is done based on the following parameters:

MPEG-2 TS adaptation: PID signaled within each transport stream packet header

GS/GSE adaptation: logical channel signaled within L2 encapsulation header.

The data for each service is received until the end of the slot. After that point, the receiver switches to the next TF-sub-frame carrying the consumed service.

Figure 17:
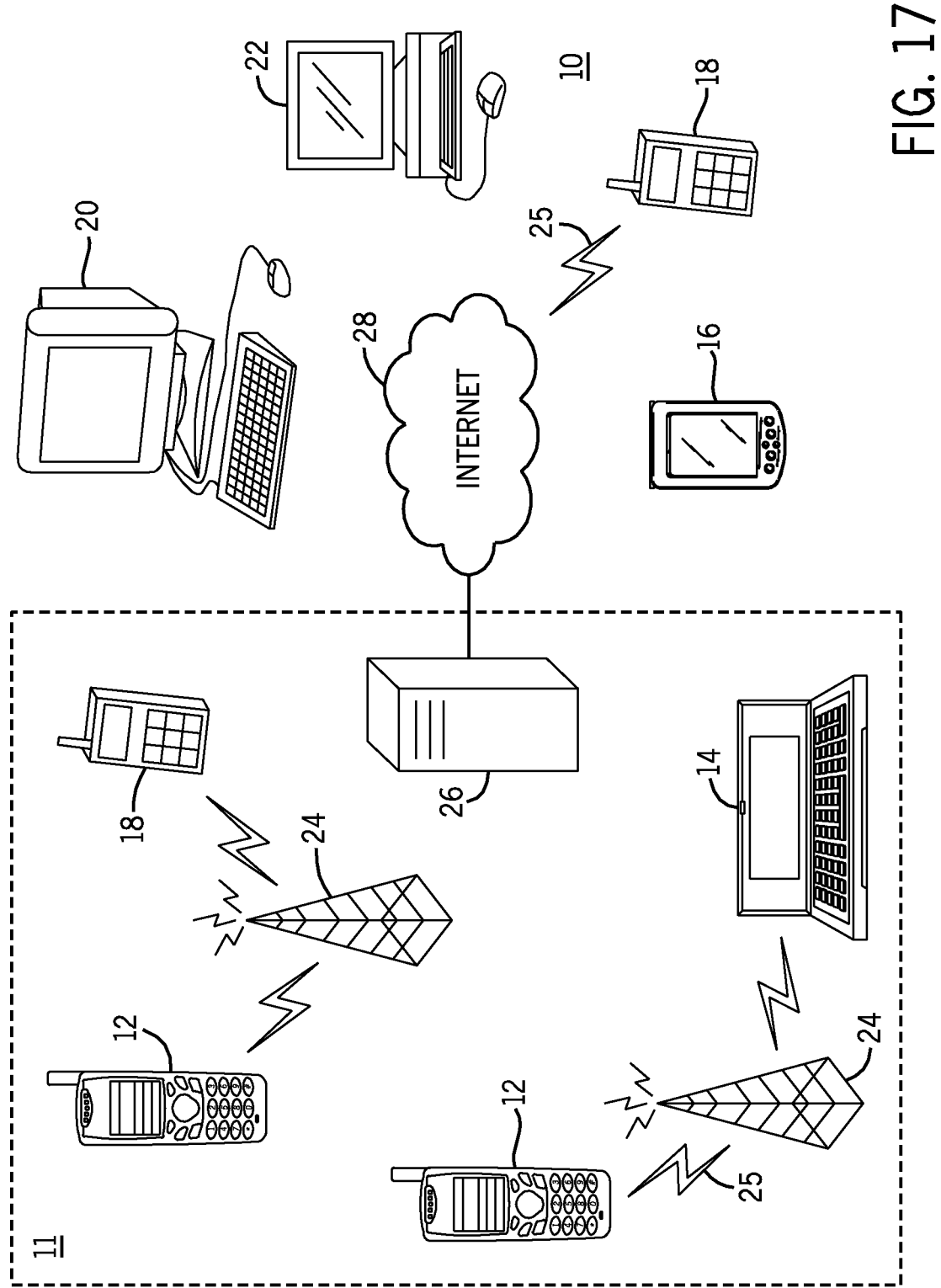
FIG. 17 is an overview diagram of a system within which various embodiments of the present invention may be implemented.

FIG. 17 shows a system 10 in which the present invention can be utilized, comprising multiple communication devices that can communicate through a network. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 17 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like. The exemplary communication devices of the system 10 may include, but are not limited to, a mobile device 12, a combination PDA and mobile telephone 14, a PDA 16, an integrated messaging device (IMD) 18, a desktop computer 20, and a notebook computer 22. Such devices can be utilize OBEX to exchange binary data as described above. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 18:
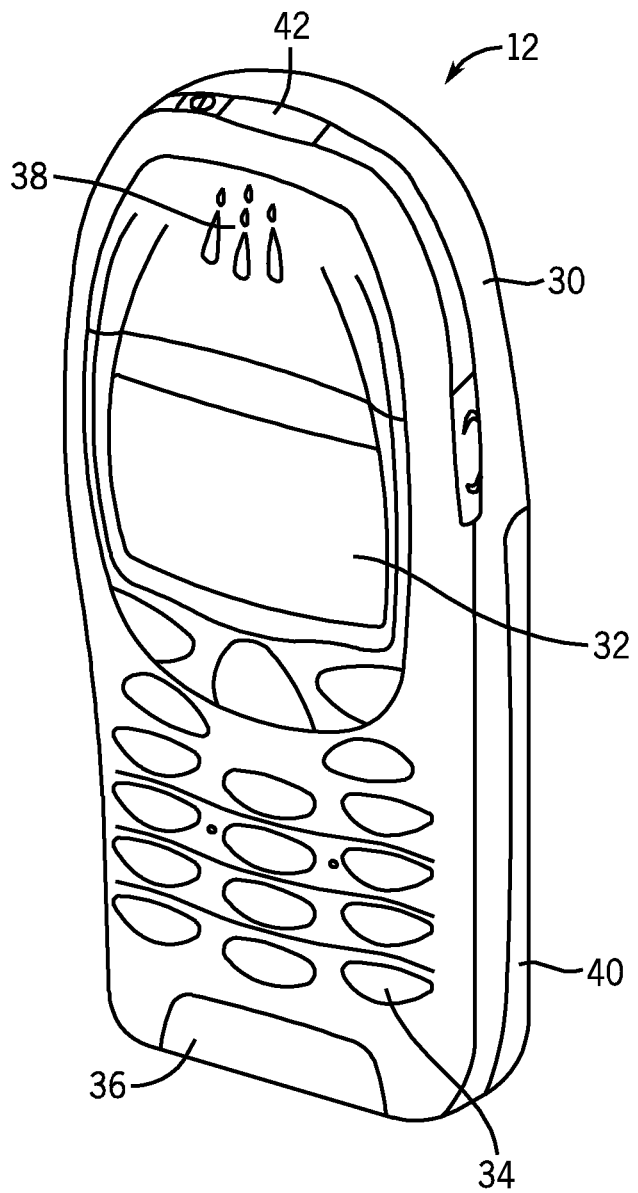
FIG. 18 is a perspective view of an electronic device that can be used in conjunction with the implementation of various embodiments of the present invention.
Figure 19:
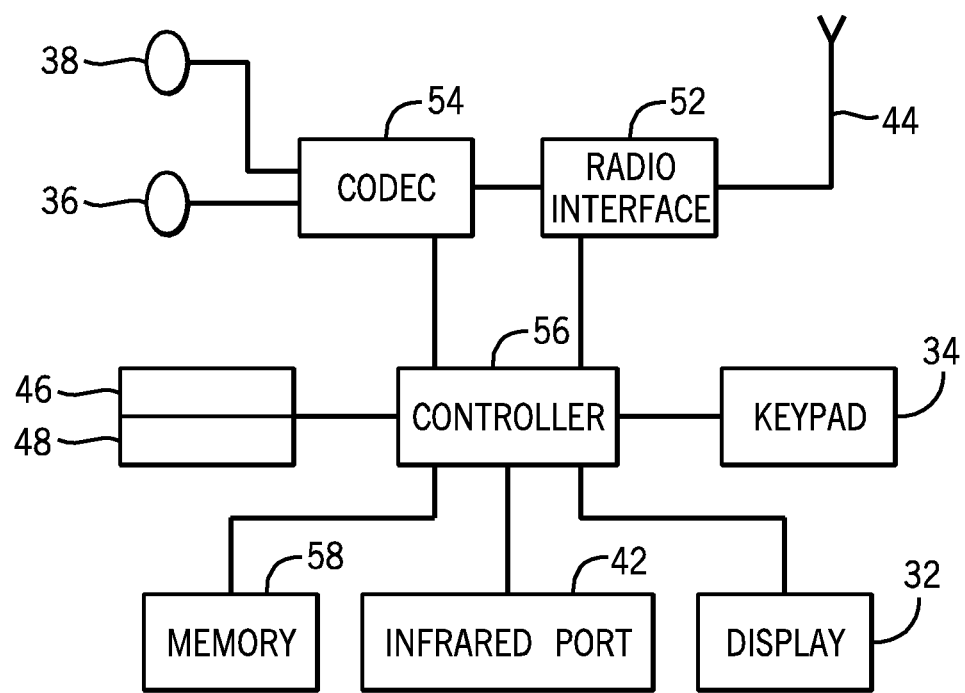
FIG. 19 is a schematic representation of the circuitry which may be included in the electronic device of FIG. 18.

FIGS. 18 and 19 show one representative mobile device 12 within which the present invention may be implemented. It should be understood, however, that the present invention is not intended to be limited to one particular type of electronic device. The mobile device 12 of FIGS. 18 and 19 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The various embodiments of the present invention described herein is described in the general context of method steps or processes, which may be implemented in one embodiment by a computer program product, embodied in a computer-readable medium, including computer-executable instructions, such as program code, executed by computers in networked environments. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments of the present invention can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description of embodiments of the present invention have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated.

What is claimed is:

1. A method, comprising:
dividing, via a transmitter, a time frequency frame into a plurality of subframes, wherein the time frequency frame comprises a plurality of non-overlapping radio frequency channels within a time period;
dividing each of the plurality of subframes into a plurality of corresponding slots;
selectively time shifting the plurality of slots such that a defined time shift exists between the corresponding slots in each subframe within the time frequency frame;
for any slots and slot portions which have been selectively shifted beyond an end of the time frequency frame, cyclically shifting such slots and slot portions to a beginning of the time frequency frame; and
writing service data into the plurality of slots of the time frequency frame.

2. The method of claim 1, wherein the plurality of slots comprises one slot for each radio frequency channel in the time frequency frame.

3. The method of claim 1, wherein each subframe comprises data from one service.

4. The method of claim 1, wherein the corresponding slots for each individual subframe have an equal size.

5. The method of claim 1, wherein an amount of the time shifting is dependent upon a duration of the time frequency frame and a number of the radio frequency channels in the time frequency frame.

6. The method of claim 1, wherein a maximum time duration of each slot is defined by $$T_{max} = \frac{T_F}{N_{RF}} - T_{tuning},$$

wherein $T_F$ is a duration of the time frequency frame, $N_{RF}$ is a number of the radio frequency channels in the time frequency frame, and $T_{tuning}$ is a maximum assumed tuning time for a receiver when changing radio frequency channels.

7. A computer program product, embodied in a non-transitory computer-readable medium, comprising computer code configured to implement the method of claim 1.

8. The method of claim 1, wherein, after selectively time shifting the plurality of slots, the slots are separated by at least a defined minimum time interval existing between each slot.

9. An apparatus, comprising:
a processor; and
a memory unit communicatively connected to the processor and including:
computer code for dividing a time frequency frame into a plurality of subframes, wherein the time frequency frame comprises a plurality of non-overlapping radio frequency channels within a time period;
computer code for dividing each of the plurality of subframes into a plurality of corresponding slots;

computer code for selectively time shifting the plurality of slots such that a defined time shift exists between the corresponding slots in each subframe within the time frequency frame;

computer code for, for any slots and slot portions which have been selectively shifted beyond an end of the time frequency frame, cyclically shifting such slots and slot portions to a beginning of the time frequency frame; and computer code for writing service data into the plurality of slots of the time frequency frame.

10. The apparatus of claim 9, wherein the plurality of slots comprises one slot for each radio frequency channel in the time frequency frame.

11. The apparatus of claim 9, wherein each subframe comprises data from one service.

12. The apparatus of claim 9, wherein the corresponding slots for each individual subframe have an equal size.

13. The apparatus of claim 9, wherein an amount of the time shifting is dependent upon a duration of the time frequency frame and a number of the radio frequency channels in the time frequency frame.

14. The apparatus of claim 9, wherein a maximum time duration of each slot is defined by $$T_{max} = \frac{T_F}{N_{RF}} - T_{tuning},$$

wherein $T_F$ is a duration of the time frequency frame, $N_{RF}$ is a number of the radio frequency channels in the time frequency frame, and $T_{tuning}$ is a maximum assumed tuning time for a receiver when changing radio frequency channels.

15. The apparatus of claim 9, wherein, after selectively time shifting the plurality of slots, the slots are separated by at least a defined minimum time interval existing between each slot.

16. An apparatus, comprising:

means for dividing a time frequency frame into a plurality of subframes, wherein the time frequency frame comprises a plurality of non-overlapping radio frequency channels within a time period;

means for dividing each of the plurality of subframes into a plurality of corresponding slots;

means for selectively time shifting the plurality of slots such that a defined time shift exists between the corresponding slots in each subframe within the time frequency frame;

means for, for any slots and slot portions which have been selectively shifted beyond an end of the time frequency frame, cyclically shifting such slots and slot portions to a beginning of the time frequency frame; and means for writing service data into the plurality of slots of the time frequency frame.

\* \* \* \* \*